US012080205B2

(12) United States Patent
Lee et al.

(10) Patent No.: US 12,080,205 B2
(45) Date of Patent: Sep. 3, 2024

(54) DEVICE AND METHOD FOR COMPENSATING FOR STAINS CAUSED BY DETERIORATION OF A DISPLAY DEVICE

(71) Applicant: SAMSUNG DISPLAY CO., LTD., Yongin-si (KR)

(72) Inventors: Hyun Dae Lee, Hwaseong-si (KR); Kyung Tea Park, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 4 days.

(21) Appl. No.: 17/493,169

(22) Filed: Oct. 4, 2021

(65) Prior Publication Data

US 2022/0139278 A1 May 5, 2022

(30) Foreign Application Priority Data

Nov. 4, 2020 (KR) .................... 10-2020-0145814

(51) Int. Cl.
*G09G 3/00* (2006.01)
*G06V 40/13* (2022.01)
*G09G 3/20* (2006.01)
*G09G 3/3208* (2016.01)

(52) U.S. Cl.
CPC ......... *G09G 3/006* (2013.01); *G06V 40/1318* (2022.01); *G09G 3/035* (2020.08); *G09G 3/2007* (2013.01); *G09G 3/3208* (2013.01); *G09G 2320/0257* (2013.01); *G09G 2320/029* (2013.01); *G09G 2320/045* (2013.01); *G09G 2360/145* (2013.01)

(58) Field of Classification Search
None
See application file for complete search history.

(56) References Cited

U.S. PATENT DOCUMENTS

| 8,797,311 | B2 | 8/2014 | Kim |
| 9,342,733 | B2 | 5/2016 | Lee et al. |
| 10,437,974 | B2 | 10/2019 | He et al. |
| 10,796,639 | B1* | 10/2020 | Hsu ...................... G09G 3/3258 |
| 2011/0050674 | A1* | 3/2011 | Kim ..................... G09G 3/3233 |
| | | | 345/76 |

(Continued)

FOREIGN PATENT DOCUMENTS

| KR | 10-2015-0101506 | 9/2015 |
| KR | 10-2019-0060025 | 6/2019 |
| KR | 10-2019-0083022 | 7/2019 |

*Primary Examiner* — Benjamin X Casarez
(74) *Attorney, Agent, or Firm* — F. CHAU & ASSOCIATES, LLC

(57) ABSTRACT

A method of compensating for stains caused by deterioration of a display device, the display device including an illuminance sensor and a display panel including pixels and an optical fingerprint sensor, the method including determining, while in a test mode of the display device and via the illuminance sensor, whether an illuminance is a reference value or less, emitting, while in the test mode of the display device, first color light from the display panel when the illuminance is the reference value or less, and acquiring, while in the test mode of the display device, afterimage compensation data relating to amounts of deterioration of the pixels by receiving the first color light through an optical fingerprint sensor.

15 Claims, 22 Drawing Sheets

(56) References Cited

U.S. PATENT DOCUMENTS

| | | | |
|---|---|---|---|
| 2016/0133193 A1* | 5/2016 | Lee | G09G 3/3275 |
| | | | 345/694 |
| 2017/0200411 A1* | 7/2017 | Song | H01L 27/3227 |
| 2018/0151153 A1* | 5/2018 | Heo | H04N 1/6008 |
| 2019/0121390 A1* | 4/2019 | Yang | G09G 3/3208 |
| 2020/0175902 A1* | 6/2020 | Huang | G06V 40/1318 |
| 2020/0202772 A1* | 6/2020 | Ji | G09G 3/3208 |
| 2020/0225708 A1* | 7/2020 | Wu | G06V 10/147 |
| 2020/0328260 A1* | 10/2020 | Tang | H01L 27/322 |

* cited by examiner

DEVICE AND METHOD FOR COMPENSATING FOR STAINS CAUSED BY DETERIORATION OF A DISPLAY DEVICE

This application claims priority under 35 U.S.C. § 119 to Korean Patent Application No. 10-2020-0145814 filed on Nov. 4, 2020 in the Korean Intellectual Property Office, the disclosure of which is incorporated by reference herein in its entirety.

1. Technical Field

The present disclosure relates to a device and method for compensating for stains caused by deterioration of a display device.

2. Description of the Related Art

A display device is an output device for presentation of information in visual form, for example. Display devices are applied to various electronic devices such as smart phones, tablet personal computers (PCs), laptop computers, monitors, and televisions. In recent years, the use of portable electronic devices, such as smart phones, tablet PCs, and laptop computers, has increased significantly due to the development of mobile communication technology. Fingerprint authentication employing a user fingerprint, which is a type of user biometric information, is used to protect user privacy information stored in an electronic device. To this end, a display device applied to an electronic device may include a fingerprint sensor for fingerprint authentication.

Fingerprint sensors may be implemented as optical types, capacitive types, and the like. A fingerprint sensor may be disposed under the display panel of a display device, and various members may be disposed between the display panel and the fingerprint sensor.

An optical stain compensation process is performed to compensate for initial stains before display devices are shipped to the market. However, stains resulting from use may limit display quality over time.

SUMMARY

Aspects of the present disclosure provide a method of compensating for stains caused by deterioration of a display device in which a stain compensation process for coping with deterioration stains developed by a user is performed.

Aspects of the present disclosure also provide a device for compensating for stains caused by deterioration of a display device which may perform a stain compensation process for coping with deterioration stains developed by a user.

It should be noted that objects of the present disclosure are not limited to the above-described objects, and other objects of the present disclosure will be apparent to those skilled in the art from the following descriptions.

According to some aspects of the present disclosure, a method of compensating for stains caused by deterioration of a display device is a method wherein the display device includes an illumination sensor and a display panel including pixels and an optical fingerprint sensor, and wherein the method includes determining, while in a test mode of the display device and via the illuminance sensor, whether an illuminance is a reference value or less, emitting, while in the test mode of the display device, first color light from the display panel when the illuminance is the reference value or less, and acquiring, while in the test mode of the display device, afterimage compensation data relating to the amounts of deterioration of the pixels by receiving the first color light through an optical fingerprint sensor.

According to some other aspects of the present disclosure, a device for compensating for stains caused by deterioration of a display device is a device including an illuminance sensor configured to determine, while the display device is in a test mode, whether an illuminance is a reference value or less, pixels configured to emit, while the display device is in the test mode, first color light when the illuminance is the reference value or less, an optical fingerprint sensor configured to acquire, while the display device is in the test mode, afterimage compensation data relating to the amounts of deterioration of the pixels by receiving the first color light, and an application chip configured to process, while the display device is in the test mode, the acquired afterimage compensation data and calculate, while the display device is in the test mode, an afterimage compensation coefficient.

Other details of embodiments are included in the Detailed Description and the drawings.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

Figure 1:
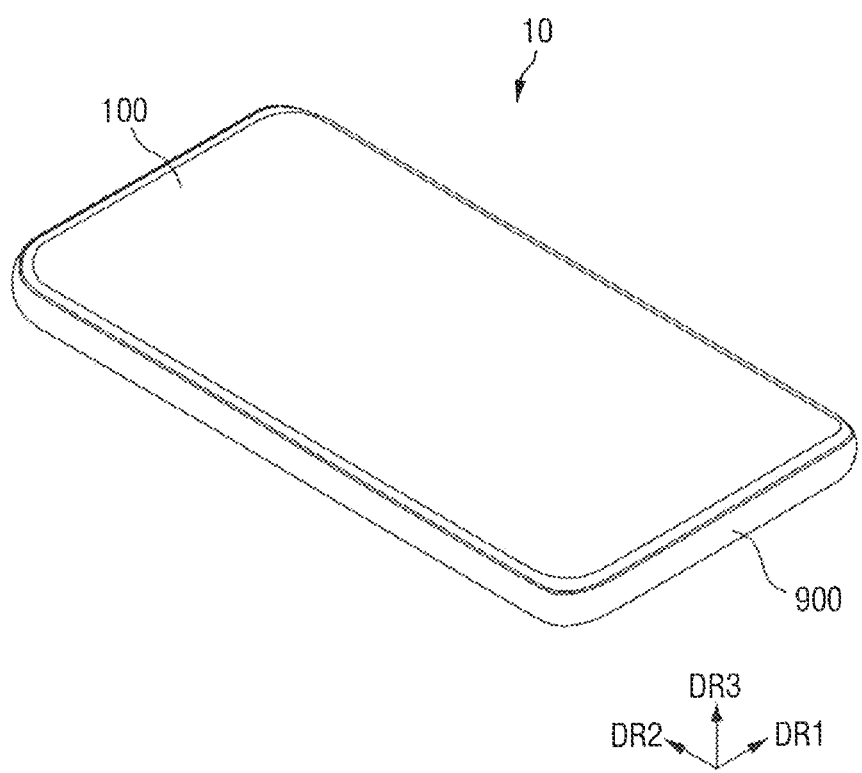
FIG. 1 is a perspective view of a display device according to an embodiment of the present disclosure.

Specific structural and functional descriptions of embodiments of the invention disclosed herein are only for illustrative purposes of the embodiments of the invention. The invention may be embodied in many different forms without departing from the spirit and characteristics of the invention. Therefore, the embodiments of the invention are disclosed only for illustrative purposes and should not be construed as limiting the invention.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between", "directly between", "adjacent to", or "directly adjacent to", should be construed in the same way.

Throughout the specification, the same reference numerals may refer to the same or like parts.

It will be understood that, although the terms "first", "second", "third", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" "element", "component", "region", "layer", or "section" discussed below could be termed a "second" element, component, region, layer, or section without departing from the teachings herein.

The terminology used herein is for the purpose of describing particular embodiments only and is not intended to be limiting. As used herein, "a", "an", "the", and "at least one" are intended to include both the singular and plural, unless the context clearly indicates otherwise. For example, "an element" has the same meaning as "at least one element", unless the context clearly indicates otherwise. "At least one" is not to be construed as limiting "a" or "an". "Or" means "and/or". As used herein, the term "and/or" includes any and all combinations of one or more of the associated listed items. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower" can therefore encompasses both an orientation of "lower" and "upper", depending on the particular orientation of the figure. Similarly, if the device in one of the figures is turned over, elements described as "below" or "beneath" other elements would then be oriented "above" the other elements. The terms "below" or "beneath" can therefore encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms such as those defined in commonly used dictionaries should be interpreted as having a meaning that is consistent with their meaning in the context of the relevant art and the present disclosure and will not be interpreted in an idealized or overly formal sense unless expressly so defined herein.

Embodiments are described herein with reference to cross section illustrations that are schematic illustrations of idealized embodiments. As such, variations from the shapes of the illustrations resulting from, for example, manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may typically have rough and/or nonlinear features. Moreover, illustrated sharp angles may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the attached drawings.

Figure 2:
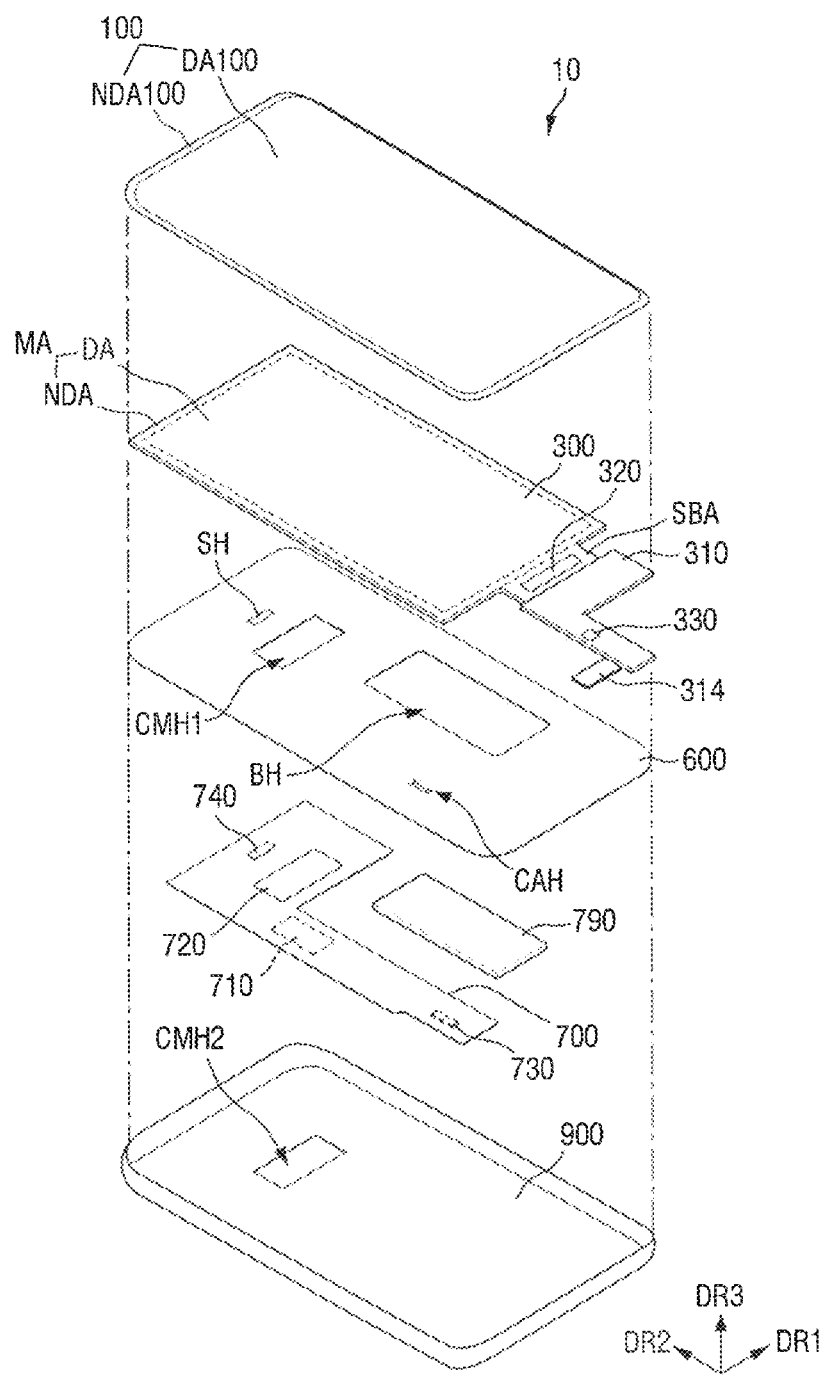
FIG. 2 is an exploded perspective view of the display device according to the embodiment of the present disclosure.
Figure 3:
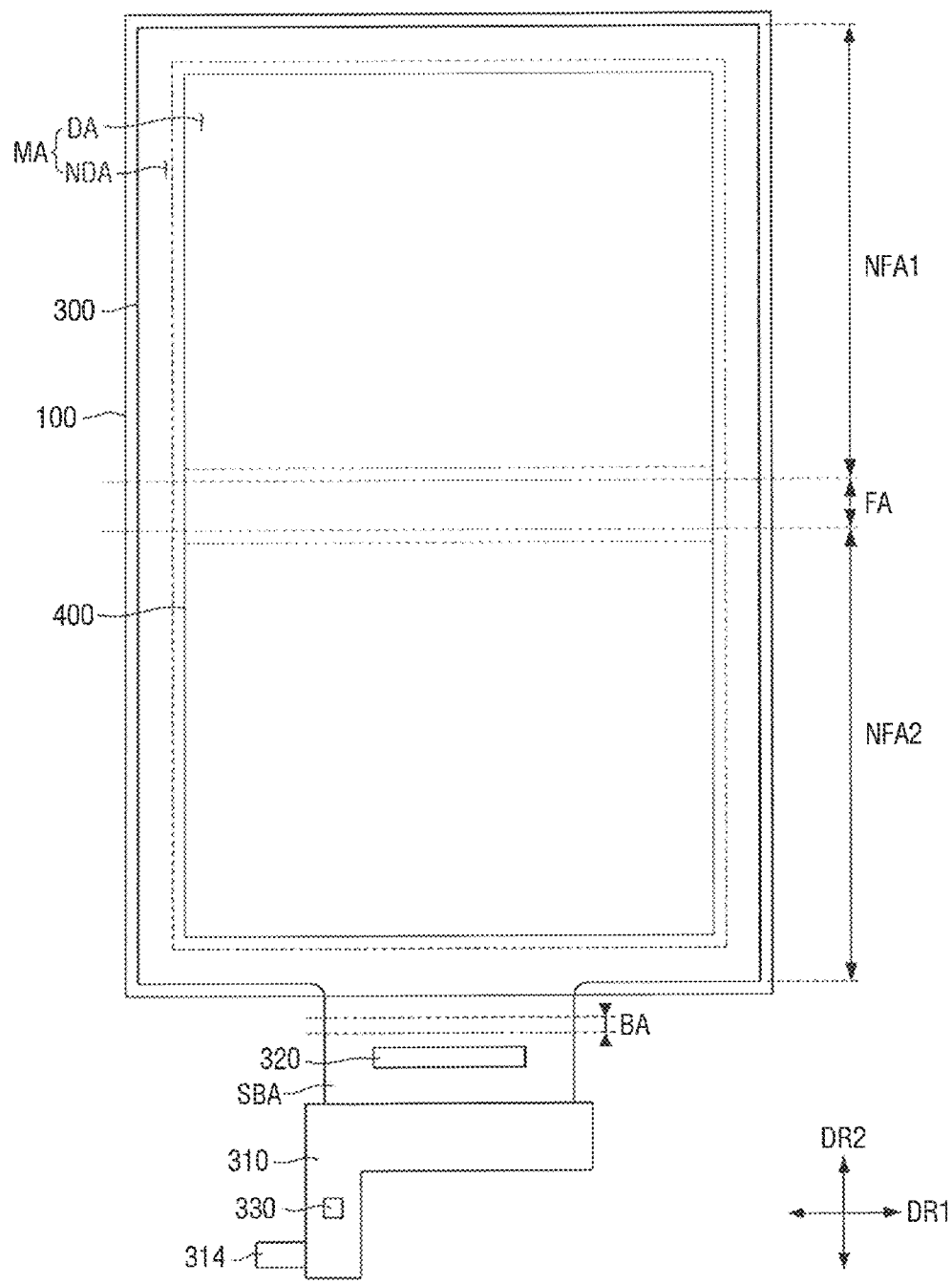
FIG. 3 is a plan view showing a display panel, an optical fingerprint sensor, a display circuit board, and a display driver circuit of FIG. 2.
Figure 4:
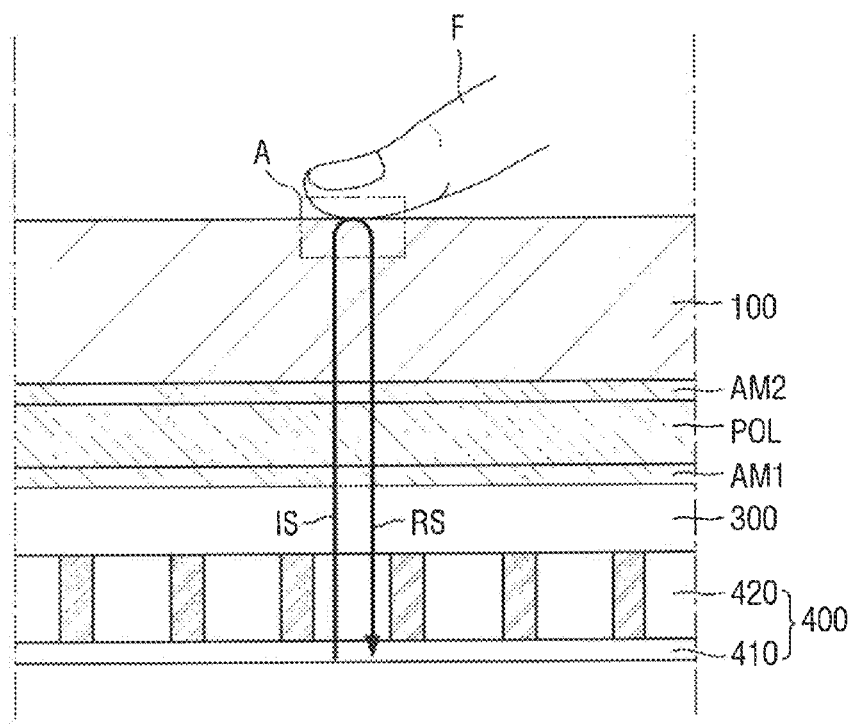
FIG. 4 is a cross-sectional view of an example of the display device according to the embodiment of the present disclosure.
Figure 5:
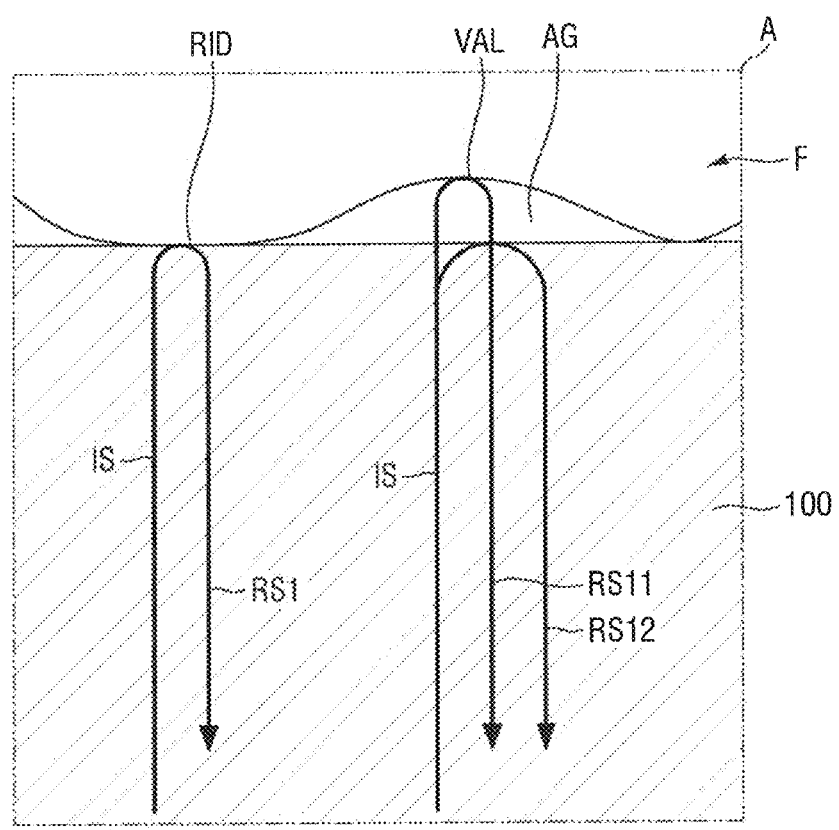
FIG. 5 is an enlarged cross-sectional view of a region A of FIG. 4.
Figure 6:
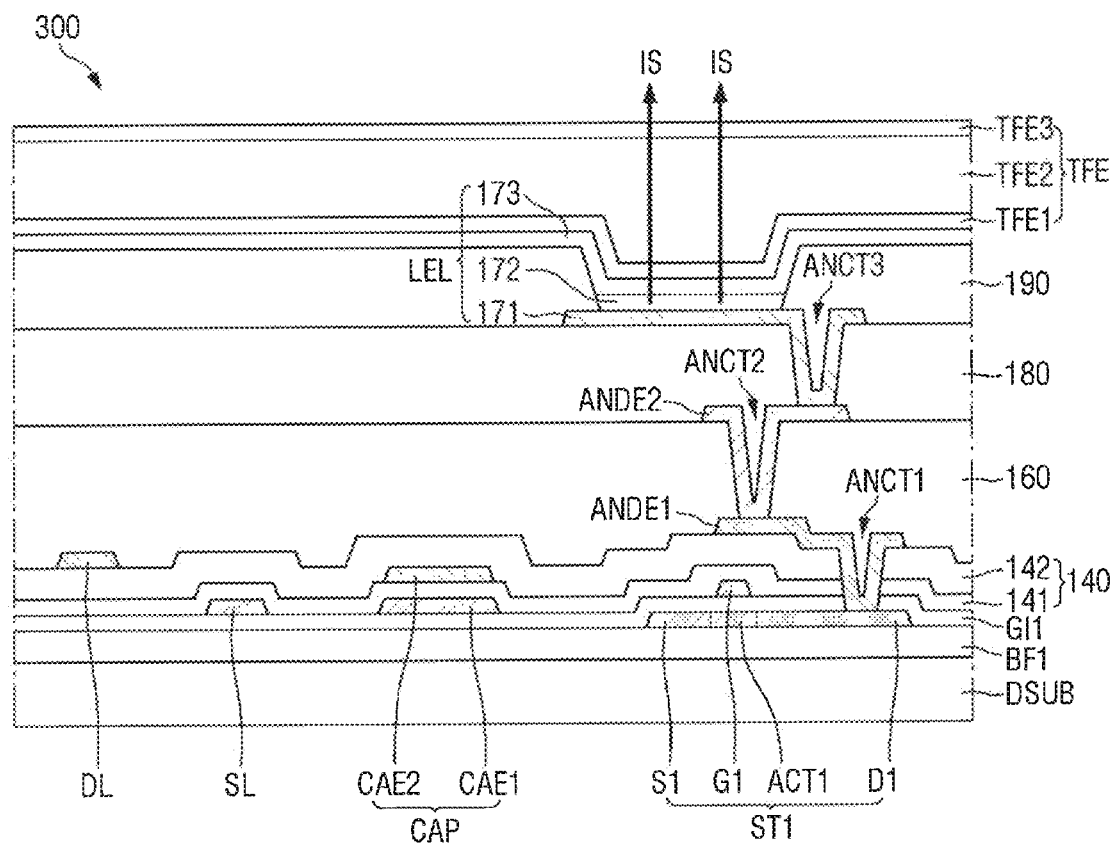
FIG. 6 is a cross-sectional view of an example of a display panel of FIG. 2.
Figure 7:
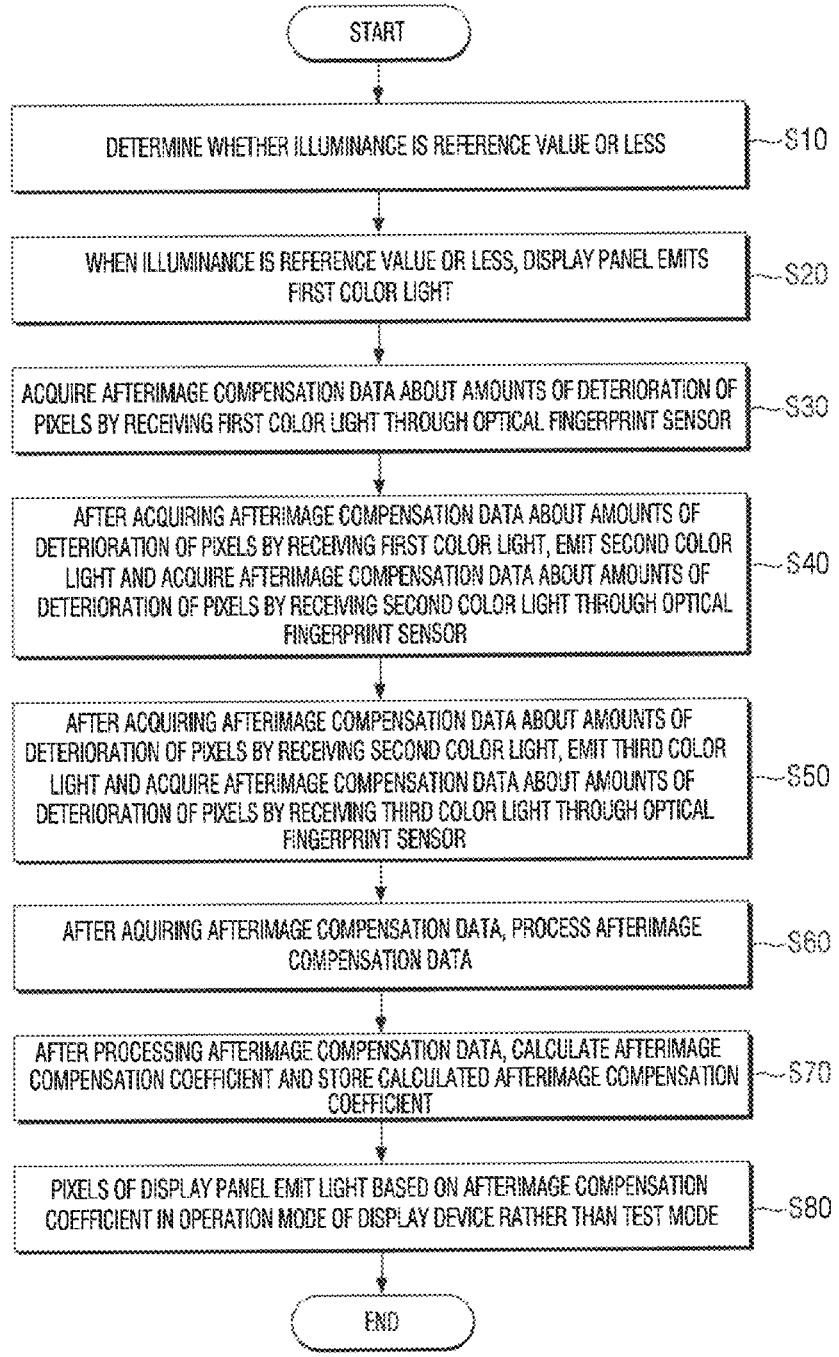
FIG. 7 is a flowchart illustrating a method of compensating for stains caused by deterioration of a display device according to an embodiment of the present disclosure.

FIG. 1 is a perspective view of a display device according to an embodiment of the present disclosure. FIG. 2 is an exploded perspective view of the display device according to the embodiment of the present disclosure, FIG. 3 is a plan view showing a display panel, an optical fingerprint sensor, a display circuit board, and a display driver circuit of FIG. 2. FIG. 4 is a cross-sectional view of an example of the display device according to the embodiment of the present disclosure. FIG. 5 is an enlarged cross-sectional view of a region A of FIG. 4. FIG. 6 is a cross-sectional view of an example of a display panel of FIG. 2. FIG. 7 is a flowchart illustrating a method of compensating for stains caused by deterioration of a display device according to an embodiment of the present disclosure. FIGS. 8 to 14 are cross-sectional views illustrating process operations of the method of compensating for stains caused by deterioration of a display device according to the embodiment of the present disclosure.

The method of compensating for stains caused by deterioration of a display device according to the embodiment of the present disclosure is a method for compensating for deterioration stains which develop when a user uses a display device. The method of compensating for deterioration stains may be performed in a test mode of a display device. First, a display device to which the method of compensating for stains caused by deterioration of a display device may be applied will be described.

A display device 10 according to the embodiment may be applied to portable electronic devices such as mobile phones, smart phones, tablet personal computers (PCs), mobile communication terminals, electronic notebooks, electronic books, portable multimedia players (PMPs), navigation devices, and ultra-mobile PCs (UMPCs). Also, the display device 10 according to the embodiment may be applied as a display part of a television, a laptop computer, a monitor, a billboard, and an Internet of things (IOT) device. Further, the display device 10 according to the embodiment may be applied to a wearable device such as a smart watch, a watch phone, a glass-type display, and a head mounted display (HMD). In addition, the display device 10 according to the embodiment may be applied to a dashboard of a car, a center fascia of a car, a center information display (CID) disposed in a dashboard of a car, a room mirror display which replaces a side mirror of a car, and a display disposed on the rear side of a front seat for backseat entertainment of a car.

In this specification, a first direction DR1 is a short-side direction of the display device 10 and may be, for example, a width direction of the display device 10. A second direction DR2 is a long-side direction of the display device 10 and may be, for example, a length direction of the display device 10. A third direction DR3 may be a thickness direction of the display device 10.

The display device 10 may have a flat shape which is similar to a rectangle. For example, the display device 10 may have a flat shape which is similar to a rectangle having short sides in the first direction DR1 and long sides in the second direction DR2. Corners at which the short sides of the first direction. DR1 and the long sides of the second direction DR2 meet may be formed in a round shape with a certain curvature or at a right angle to each other. The flat shape of the display device 10 is not limited to a rectangle and may be formed to be similar to another polygon, a circle, or an oval.

The display device 10 may be formed to be level. Also, the display device 10 may be formed so that two opposite sides may be bent. For example, the display device 10 may be formed so that the left and right sides may be bent. Further, the display device 10 may be formed so that the upper, lower, left, and right sides all may be bent.

The display device 10 according to the embodiment includes a cover window 100, a display panel 300, a display circuit board 310, a display driver circuit 320, an optical fingerprint sensor 400, a bracket 600, a main circuit board 700, and a lower cover 900.

The cover window 100 may be disposed on the display panel 300 to cover the front side of the display panel 300. Therefore, the cover window 100 may function to protect the upper surface of the display panel 300.

The cover window 100 may include a transmission part DA100 corresponding to the display panel and a shaded part NDA100 corresponding to a region excluding the display panel 300. The shaded part NDA100 may be formed to be opaque. Alternatively, the shaded part NDA100 may be formed as a decorative layer in which a pattern that may be shown to a user when no image is displayed is formed.

The display panel 300 may be disposed under the cover window 100. The display panel 300 may be a light-emitting display panel including light-emitting elements. For example, the display panel 300 may be an organic light-emitting display panel, which employs organic light-emitting diodes (LEDs) including an organic light-emitting layer, a micro-LED display panel, which employs micro LEDs, a quantum dot light-emitting display panel, which employs quantum dot LEDs including a quantum dot light-emitting layer, or an inorganic light-emitting display panel which employs inorganic light-emitting elements including an inorganic semiconductor. A case in which the display panel 300 is an organic light-emitting display panel will be mainly described below.

The display panel 300 may include a main area MA and a subarea SBA.

The main area MA may include a display area DA in which an image is displayed and a non-display area. NDA which is an area around the display area DA. The display area DA may include display pixels which display an image. The non-display area NDA may be a region from the edge of the display area DA to the edge of the display panel 300.

The display area DA may include a fingerprint detection region. The fingerprint detection region indicates a region in which the optical fingerprint sensor 400 is disposed. The fingerprint detection region may be a part of the display area DA as shown in FIG. 3. The optical fingerprint sensor 400 is a fingerprint sensor employing an optical method.

The main area MA of the display panel 300 may have a rectangular planar shape. For example, the main area MA may have a rectangular planar shape in which the corners have a right angle. However, the planar shape of the main area MA is not limited thereto and may be a rectangle in which the corners are round.

The subarea SBA may protrude in the second direction DR2 from one side of the main area MA. The subarea SBA may have a smaller length in the first direction DR1 than the main area MA and have a smaller length in the second direction DR2 than the main area MA, but the length of the subarea SBA is not limited thereto.

FIG. 2 illustrates a subarea SBA that is not folded, but the subarea SBA may be bent. In this case, the subarea SBA may be disposed on the lower surface of the display panel 300, When the subarea SBA is bent, the subarea SBA may overlap the main area MA in the thickness direction DR3 of a substrate SUB. The display circuit board 310 and the display driver circuit 320 may be disposed in the subarea SBA.

The display circuit board 310 may be attached to one end of the subarea SBA of the display panel 300 using a conductive adhesive member such as an anisotropic conductive film. Therefore, the display circuit board 310 may be electrically connected to the display panel 300 and the display driver circuit 320. The display panel 300 and the display driver circuit 320 may receive digital video data, timing signals, and driving voltages. The display circuit board 310 may be a flexible printed circuit board, a printed circuit board, or a flexible film such as a chip-on-film.

The display driver circuit 320 may generate signals and voltages to operate the display panel 300. The display driver circuit 320 may be formed as an integrated circuit (IC) and attached onto the subarea SBA of the display panel 300 in a chip-on-glass (COG) manner, a chip-on-plastic (COP) manner, or an ultrasonic bonding manner, but the display driver circuit 320 is not limited thereto. For example, the display driver circuit 320 may be attached onto the display circuit board 310 in a chip-on-film (COF) manner.

An application chip 330 may be disposed on the display circuit board 310. Also, a power supply part may be additionally disposed on the display circuit board 310 to supply display driving voltages for operating the display driver circuit 320.

The optical fingerprint sensor 400 may be disposed on the lower surface of the display panel 300. The optical fingerprint sensor 400 may be disposed in the entire display area DA of the display panel 300. The optical fingerprint sensor 400 may completely cover the display area DA of the display panel 300. In some embodiments, the optical fingerprint sensor 400 may not completely cover the display area DA of the display panel 300 and may partially expose the edge of the display area DA adjacent to the non-display area NDA.

The bracket 600 may be disposed under the display panel 300. The bracket 600 may include plastic, a metal, or both plastic and a metal in the bracket 600, a first camera hole CMH1 in which a first camera sensor 720 is inserted, a battery hole BH in which a battery is disposed, a sensor hole SH in which an illuminance sensor 740 is disposed, and a cable hole CAH through which a cable 314 connected to the display circuit board 310 passes may be formed.

Under the bracket 600, the main circuit board 700 and a battery 790 may be disposed. The main circuit board 700 may be a printed circuit board or a flexible printed circuit board.

The main circuit board 700 may include a main processor 710, the first camera sensor 720, and a main connector 730. The first camera sensor 720 may be disposed on both the upper surface and lower surface of the main circuit board 700. The main processor 710 may be disposed on the upper surface of the main circuit board 700, and the main connector 730 may be disposed on the lower surface of the main circuit board 700.

The main processor 710 may control all functions of the display device 10. For example, the main processor 710 may output digital video data to the display driver circuit 320 through the display circuit board 310 so that the display panel 300 may display an image. Also, the main processor 710 may convert first image data input from the first camera sensor 720 into digital video data and output the digital video data to the display driver circuit 320 through the display circuit board 310 such that an image captured by the first camera sensor 720 may be displayed on the display panel 300.

The first camera sensor 720 processes video frames, such as still images or moving images, obtained by an image sensor and outputs the processed video frames to the main processor 710. The first camera sensor 720 may be a complementary metal-oxide semiconductor (CMOS) image sensor or a charge-coupled device (CCD) sensor. The first camera sensor 720 may be exposed at the lower surface of the lower cover 900 through a second camera hole CMH2, and thus it is possible to image an object or background disposed under the display device 10.

The cable 314 passing through the cable hole CAH of the bracket 600 may be connected to the main connector 730. Therefore, the main circuit board 700 may be electrically connected to the display circuit board 310.

The illuminance sensor 740 may be additionally disposed on the main circuit board 700. FIG. 2 illustrates that the illuminance sensor 740 is disposed upward, but the direction in which the illuminance sensor 740 is disposed is not limited thereto. As described below, the lower surface of the illuminance sensor 740 may be exposed through a second sensor hole of the lower cover 900.

The battery 790 may be disposed to not overlap the main circuit board 700 in the third direction DR3. The battery 790 may overlap the battery hole BH of the bracket 600. Also, the optical fingerprint sensor 400 may overlap the battery hole BH of the bracket 600.

In addition, a mobile communication module, which may transmit and receive wireless signals to and from at least one of a base station, an external terminal, and a server, may further be installed on the main circuit board 700. The wireless signals may include audio signals, video call signals, or various forms of data resulting from transmitting and receiving text and multimedia messages.

The lower cover 900 may be disposed under the main circuit board 700 and the battery 790. The lower cover 900 may be fixedly coupled to the bracket 600. The lower cover 900 may form the lower exterior of the display device 10. The lower cover 900 may include plastic, a metal, or both plastic and a metal.

In the lower cover 900, the second camera hole CMH2 may be formed to expose the lower surface of the first camera sensor 720, The position of the first camera sensor 720 and the positions of the first and second camera holes CMH1 and CMH2 corresponding to the first camera sensor 720 are not limited to the embodiment shown in FIG. 2.

Referring to FIG. 3, a folding area FA and non-folding areas NFA1 and NFA2 may be additionally provided in the display device 10. The folding area FA may have a linear shape extending in the first direction DR1. The first non-folding area NFA1 may be disposed on one side of the folding area FA in the second direction DR2, and the second non-folding area NFA2 may be disposed on the other side of the folding area FA in the second direction DR2. The area of each of the non-folding areas NFA1 and NFA2 may be larger than the area of the folding area FA but is not limited thereto.

The display device 10 may be a foldable display device which can be folded and unfolded on the basis of the folding area FA with the non-folding areas NFA1 and NFA2 left unfolded. The display device 10 may be an in-foldable display device which is in-folded on the basis of the folding area FA so that the upper surface of the first non-folding area NFA1 and the upper surface of the second non-folding area NFA2 may face each other or an out-foldable display device which is out-folded on the basis of the folding area FA so that the lower surface of the first non-folding area NFA1 and the lower surface of the second non-folding area NFA2 may face each other.

Referring to FIG. 6, the display panel 300 may include display pixels which display an image. Each of the display pixels may include a light-emitting element LEL, a first thin film transistor ST1, and a capacitor CAP.

A display substrate DSUB may be formed of an insulating material such as glass or a polymer resin. For example, the display substrate DSUB may include polyimide. The display substrate DSUB may be a flexible substrate which is bendable, foldable, rollable, or the like.

The display substrate DSUB may include, for example, a plurality of organic layers and a plurality of inorganic layers. As an example, the display substrate DSUB may include a first organic layer, a first barrier layer which is disposed on the first organic layer and includes at least one inorganic layer, a second organic layer disposed on the first barrier layer, and a second barrier layer which is disposed on the second organic layer and includes at least one inorganic layer.

A first buffer film BF1 may be disposed on the display substrate DSUB. The first buffer film BF1 is a film for protecting a thin film transistor of a thin film transistor layer and a light-emitting layer 172 of an emission layer. The first buffer film BF1 may be formed of a plurality of inorganic films which are alternately stacked. For example, the first buffer film BF1 may be formed of multiple films obtained by alternately stacking one or more inorganic films among a silicon nitride layer, a silicon oxynitride layer, a silicon oxide layer, a titanium oxide layer, and an aluminum oxide layer.

A first active layer ACT1, a first source electrode S1, and a first drain electrode D1 of the first thin film transistor ST1 may be disposed on the first buffer film BF1. The first active layer ACT1 of the first thin film transistor ST1 may include a polycrystalline silicon, a single-crystal silicon, a low-temperature polycrystalline silicon, an amorphous silicon, or an oxide semiconductor. The first source electrode S1 and the first drain electrode D1 may have conductivity because a silicon semiconductor or an oxide semiconductor is doped with ions or impurities. The first active layer ACT1 may overlap a first gate electrode G1 in the third direction DR3 which is the thickness direction of the display substrate DSUB, and the first source electrode S1 and the first drain electrode D1 may not overlap the first gate electrode G1 in the third direction DR3.

A first gate insulating film G11 may be disposed on the first active layer ACT1 of the first thin film transistor ST1. The first gate insulating film G11 may be formed of an inorganic film, for example, a silicon nitride layer, a silicon oxynitride layer, a silicon oxide layer, a titanium oxide layer, or an aluminum oxide layer.

The first gate electrode G1 of the first thin film transistor ST1, a first capacitor electrode CAE1, and a scan line SL may be disposed on the first gate insulating film G11. The first gate electrode C11 may overlap the first active layer ACT1 in the third direction DR3. The scan line SL may be electrically connected to the first gate electrode G1. The first capacitor electrode CAE1 may overlap a second capacitor electrode CAE2 in the third direction DR3. The first gate electrode G1 and the scan line SL may be formed of a single layer or multiple layers made of any one of molybdenum (Mo), aluminum (Al), chrome (Cr), gold (Au), titanium (Ti), nickel (Ni), neodymium (Nd), and copper (Cu) or an alloy thereof.

A first interlayer insulating film 141 may be disposed on the first gate electrode G1 and the first capacitor electrode CAM. The first interlayer insulating film 141 may be formed of an inorganic film, for example, a silicon nitride layer, a silicon oxynitride layer, a silicon oxide layer, a titanium oxide layer, or an aluminum oxide layer.

The second capacitor electrode CAE2 may be disposed on the first interlayer insulating film 141. Since the first interlayer insulating film 141 has a certain dielectric constant, the capacitor CAP may be formed by the first capacitor electrode CAE1, the second capacitor electrode CAE2, and the first interlayer insulating film 141 disposed between the first capacitor electrode CAE1 and the second capacitor electrode CAE2. The second capacitor electrode CAE2 may be formed of a single layer or multiple layers made of any one of molybdenum (Mo), aluminum (Al), chrome (Cr), gold (Au), titanium (Ti), nickel (Ni), neodymium (Nd), and copper (Cu) or an alloy thereof.

A second interlayer insulating film 142 may be disposed on the second capacitor electrode CAE2. The second interlayer insulating film 142 may be formed of an inorganic film, for example, a silicon nitride layer, a silicon oxynitride layer, a silicon oxide layer, a titanium oxide layer, or an aluminum oxide layer. The second interlayer insulating film 142 may include a plurality of inorganic films.

A first pixel connection electrode ANDE1 and a data line DL may be disposed on the second interlayer insulating film 142. The first pixel connection electrode ANDE1 may be connected to the first drain electrode D1 of the first thin film transistor ST1 through a first pixel contact hole ANCT1 which passes through the first interlayer insulating film 141 and the second interlayer insulating film 142 to expose the first drain electrode D1 of the first thin film transistor ST1. The first pixel connection electrode ANDE1 may be formed of a single layer or multiple layers made of any one of molybdenum (Mo), aluminum (Al), chrome (Cr), gold (Au), titanium (Ti), nickel (Ni), neodymium (Nd), and copper (Cu) or an alloy thereof.

A first organic film 160 for planarization may be disposed on the first pixel connection electrode ANDE1. The first organic film 160 may be formed of acryl resin, epoxy resin, phenolic resin, polyamide resin, polyimide resin, or the like.

A second pixel connection electrode ANDE2 may be disposed on the first organic film 160. The second pixel connection electrode ANDE2 may be connected to the first pixel connection electrode ANDE1 through a second pixel contact hole ANCT2 which passes through the first organic film 160 to expose the first pixel connection electrode ANDE1. The second pixel connection electrode ANDE2 may be formed of a single layer or multiple layers made of any one of molybdenum (Mo), aluminum (Al), chrome (Cr), gold (Au), titanium (Ti), nickel (Ni), neodymium (Nd), and copper (Cu) or an alloy thereof.

A second organic film 180 may be disposed on the second pixel connection electrode ANDE2. The second organic film 180 may be formed of acryl resin, epoxy resin, phenolic resin, polyamide resin, polyimide resin, or the like.

Meanwhile, in an embodiment, the second pixel connection electrode ANDE2 and the second organic film 180 may be omitted. In this case, the first pixel connection electrode. ANDE1 may be directly connected to a light-emitting pixel electrode 171.

Although the first thin film transistor ST1 is illustrated as being formed in a top gate manner in which the first gate electrode G1 is positioned above the first active layer ACT1, the location of the first gate electrode G1 is not limited thereto. The first thin film transistor ST1 may be formed in a bottom gate manner in which the first gate electrode G1 is positioned below the first active layer ACT1 or in a double gate manner in which the first gate electrode G1 is positioned both above and below the first active layer ACT1.

Light-emitting elements LEL and a bank 190 may be disposed on the second organic film 180. Each of the light-emitting elements LEL includes the light-emitting pixel electrode 171, a light-emitting layer 172, and a light-emitting common electrode 173.

The light-emitting pixel electrode 171 may be formed on the second organic film 180. The light-emitting pixel electrode 171 may be connected to the second pixel connection electrode ANDE2 through a third pixel contact hole ANCT3 which passes through the second organic film 180 to expose the second pixel connection electrode ANDE2.

In a top emission structure which emits light in a direction from the light-emitting layer 172 toward the light-emitting common electrode 173, the light-emitting pixel electrode 171 may be formed of a metal material with high reflectance such as a stacked structure of aluminum and titanium (Ti/Al/Ti), a stacked structure of aluminum and indium tin oxide (ITO) (ITO/Al/ITO), an Ag—Pd—Cu (APC) alloy, and a stacked structure of an AFC alloy and ITO (ITO/APC/ITO). The APC alloy is an alloy of silver (Ag), palladium (Pd), and copper (Cu).

The bank 190 may be formed to divide the light-emitting pixel electrode 171 on the second organic film 180 in order to define an emission area EA. The bank 190 may be formed to cover the edge of the light-emitting pixel electrode 171. The bank 190 may be formed of an organic film such as acryl resin, epoxy resin, phenolic resin, polyamide resin, or polyimide resin.

The emission area EA represents a region in which the light-emitting pixel electrode 171, the light-emitting layer 172, and the light-emitting common electrode 173 are sequentially stacked such that holes from the light-emitting pixel electrode 171 and electrons from the light-emitting common electrode 173 are combined with each other to emit light.

The light-emitting layer 172 is formed on the light-emitting pixel electrode 171 and the bank 190. The light-emitting layer 172 includes an organic material to emit light of a certain color. For example, the light-emitting layer 172 includes a hole transport layer, an organic material layer, and an electron transport layer. The light-emitting layer 172 emits light of at least one color. The light of at least one color may include light of a first color, light of a second color, and light of a third color. The light of the first color may be red light, the light of the second color may be green light, and the light of the third color may be blue light.

The light-emitting common electrode 173 is formed on the light-emitting layer 172. The light-emitting common electrode 173 may be formed to cover the light-emitting layer 172. The light-emitting common electrode 173 may be a common layer which is formed in all emission areas EA in common. A capping layer may be formed on the light-emitting common electrode 173.

In the top emission structure, the light-emitting common electrode 173 may be formed of a transparent conductive oxide (TCO), such as ITO or indium zinc oxide (IZO), which may transmit light or a semi-transmissive conductive material such as magnesium (Mg), silver (Ag), or an alloy of magnesium (Mg) and silver (Ag).

An encapsulation layer TFE may be disposed on the light-emitting common electrode 173. The encapsulation layer TFE includes at least one inorganic film to prevent the infiltration of oxygen or moisture into the emission layer EML. Also, the encapsulation layer TFE includes at least one organic film to protect the emission layer EML from foreign matter such as dust. For example, the encapsulation layer TFE includes a first encapsulation inorganic film TFE1, an encapsulation organic film TFE2, and a second encapsulation inorganic film TFE3.

FIG. 4 illustrates that a user may touch the upper surface of the cover window 100 with a finger F for fingerprint recognition.

Referring to FIG. 4, the display device 10 may include a polarization layer POL, the cover window 100, a metal plate, a filling member, and coupling members AM1 and AM2 which couples adjacent members together.

The polarization layer POL may be disposed on the display panel 300. The polarization layer POL may be attached onto the upper surface of the display panel by means of the first coupling member AM1. The polarization layer POL serves to reduce the reflection of external light which is incident through the cover window 100. The first coupling member AM1 may be a transparent adhesive resin, such as an optically clear resin (OCR), or a transparent adhesive film such as an optically clear adhesive (OCA) film.

The cover window 100 may be disposed on the upper surface of the polarization layer POL. The cover window 100 may be attached onto the upper surface of the polarization layer POL by means of the second coupling member AM2. In some embodiments, the polarization layer POL may be omitted. In embodiments without the polarization layer POL, color filters and a black matrix disposed between the color filters may be disposed between the cover window 100 and the display panel 300. The second coupling member AM2 may be selected from among the aforementioned materials of the first coupling member AM1.

The optical fingerprint sensor 400 may be disposed on the lower surface of the display panel 300. The optical fingerprint sensor 400 may include an optical sensor layer 410 and an optical layer 420 disposed between the optical sensor layer 410 and the display panel 300. The optical sensor layer 410 includes a plurality of sensors which transmit first light signals IS upward aid receive second light signals RS reflected by the fingerprint of the finger F, and the optical layer 420 adjusts the optical paths of the first light signals IS and the second light signals RS to increase transmission and reception efficiency. The optical layer 420 may include bundles of optical fibers, but various members that perform an optical path adjustment function and are well-known in the technical field may be applied.

As shown in FIGS. 4 and 5, the finger F may include the fingerprint, which is a surface directed toward the cover window 100. The fingerprint of the finger F may include concave portions and convex portions. The concave portions and the convex portions of the fingerprint may be repeatedly disposed. On the basis of at least one section including one concave portion and one convex portion among the repeated concave and convex portions, the convex portion may be referred to as a ridge RID, and the concave portion may be referred to as a valley VAL. The ridge RID of the fingerprint may be positioned to be closer to the cover window 100 than the valley VAL of the fingerprint. An operating method of an optical fingerprint sensor will be described in further detail with reference to FIG. 6.

In some embodiments, additional layers may be disposed between the display panel 300 and the optical fingerprint sensor 400. The layers may include at least one functional layer. The functional layer may perform a heat dissipation function, an electromagnetic wave shielding function, a grounding function, a buffer function, a reinforcement function, a support function, a digitizing function, and/or the like.

Referring to FIGS. 4 and 5, the first light signals IS are emitted toward the ridge RID and the valley VAL of the fingerprint and then reflected by the ridge RID and the valley VAL. The first light signal IS emitted toward the ridge RID may pass through the optical layer 420, the display panel 300, the first coupling member AM1, the polarization layer POL, the second coupling member AM2, and the cover window 100 and reach the ridge RID. As shown in FIG. 5, the ridge RID comes in direct contact with the cover window 100 such that any gap, for example an air gap AG, may not be present between the ridge RID and the cover window 100. On the contrary, the first light signal IS emitted toward the valley VAL may pass through the display panel 300, the first coupling member AM1, the polarization layer POL, the second coupling member AM2, the cover window 100, and the air gap AG and reach the valley VAL. Compared with the first light signal IS emitted toward the ridge RID, the first light signal IS emitted toward the valley VAL may additionally pass through the air gap AG. Among the first light signals IS generated by the optical fingerprint sensor 400, the first light signal IS emitted toward the ridge RID may be converted into a second light signal RS1 reflected by the ridge RID, and the first light signal IS emitted toward the valley VAL may be converted into second light signals RS2 including a second-first light signal RS11 reflected at the interface between the air gap AG and the cover window 100 and a second-second light signal RS12 reflected by the valley VAL. The second-first light signal RS11 may have a greater magnitude than the second-second light signal RS12.

The optical fingerprint sensor 400 may recognize the ridge RID and the valley VAL on the basis of a first time difference between a generation time point of the first light signals IS and an arrival time point of the second light signal RS1 and of second time differences between the generation time point of the first light signals IS and arrival time points of the second light signal RS12 and RS11 reflected at the valley VAL and the interface between the air gap AG and the cover window 100. However, the air gap is present between the valley VAL and the cover window 100, and ultrasonic waves generally have different velocities depending on the medium. Accordingly, it may not be easy to distinguish between the ridge RID and the valley VAL on the basis of the first time difference and the second time differences.

Therefore, a method of distinguishing the ridge RID and the valley VAL by calculating a ratio of the intensity of the first light signal IS and the intensity of the second light signal RS1 may be used to distinguish the ridge RID and the valley VAL better in consideration of the air gap AG between the valley VAL and the cover window 100. The ratio of the intensity of a first light signal IS and the intensity of a second light signal RS is defined as a reflection coefficient. More specifically, the reflection coefficient of the first light signal IS emitted toward the valley VAL may be greater than the reflection coefficient of the first light signal IS emitted toward the ridge RID. In other words, the ridge RID and the valley VAL may be distinguished on the basis of the reflection coefficients of the first light signals IS and the corresponding second light signals RS.

As described above, the display device 10 operates in a test mode and an operation mode which is not the test mode. The method of compensating for stains caused by deterioration of a display device may be performed in the test mode of the display device 10, and the operation mode of the display device 10 indicates all states of the display device 10 excluding the test mode. The operation mode of the display device 10 includes a display operation mode in which a screen is displayed to a user through a display surface.

Figure 8:
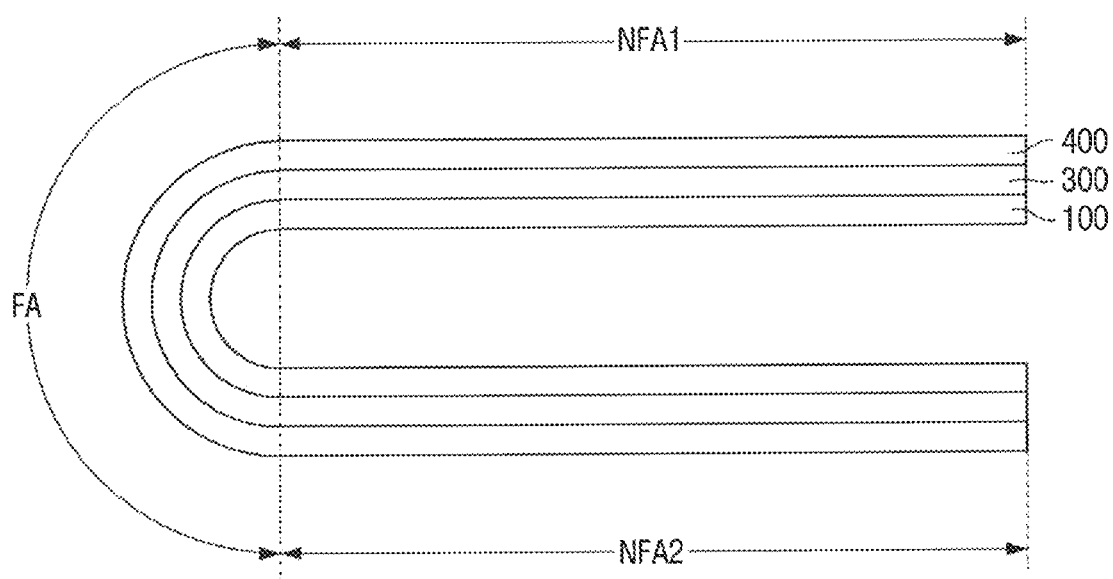
FIGS. 8 to 14 are cross-sectional views illustrating process operations of the method of compensating for stains caused by deterioration of a display device according to the embodiment of the present disclosure.

In the test mode of the display device 10, the display device 10 is in a folded state as shown in FIG. 8. In the folded state, display surfaces of the first non-folding area NFA1 and the second non-folding area NFA2 of the display panel 300 may face each other.

In the test mode of the display device 10, the illuminance sensor 740 may be used to determine Whether the illuminance is a reference value or less (FIG. 7, S10).

Figure 9:
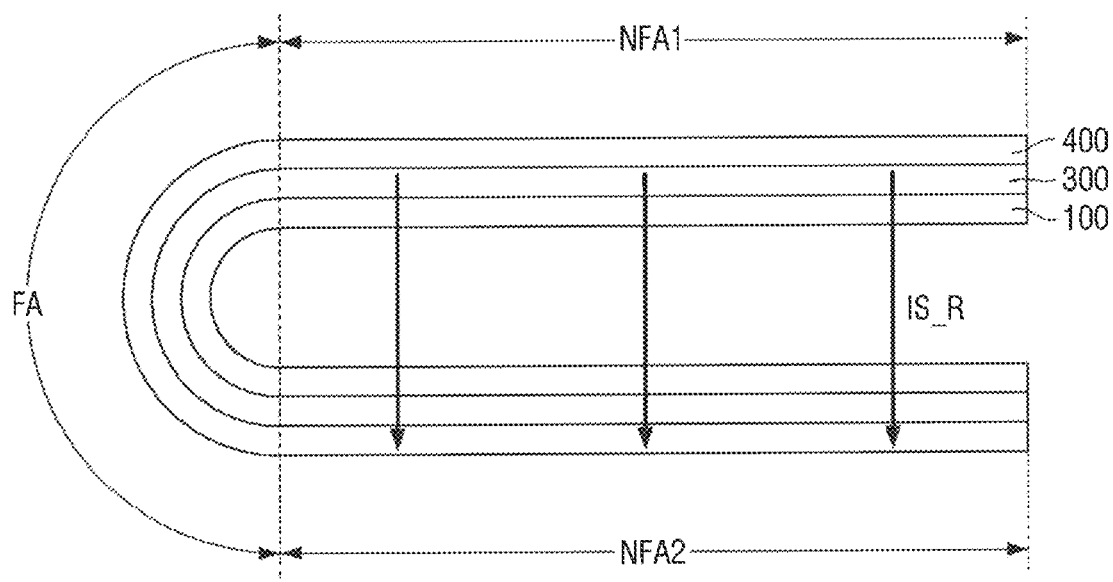

Subsequently, as shown in FIG. 9, first color light IS_R is emitted from pixels in the first non-folding area NFA1 of the display panel 300 when the illuminance is the reference value or less (FIG. 7, S20). Then, the first color light IS_R is received through the optical fingerprint sensor 400 such that afterimage compensation data is acquired regarding the amounts of deterioration of the pixels present in the first non-folding area NFA1 (FIG. 7, S30). Acquisition of afterimage compensation data for the amounts of deterioration of the pixels present in the first non-folding area NFA1 of the display panel 300 by receiving the first color light IS_R may be performed for each of a plurality of grayscales of the first color light IS_R. For example, the plurality of grayscales of the first color light IS_R may include level 0 to level 255. Level 0 of the plurality of grayscales of the first color light IS_R may have the lightest color saturation, and level 255 may have the heaviest color saturation. The color saturation of the plurality of grayscales gradually increases from level 0 to level 255.

Figure 10:
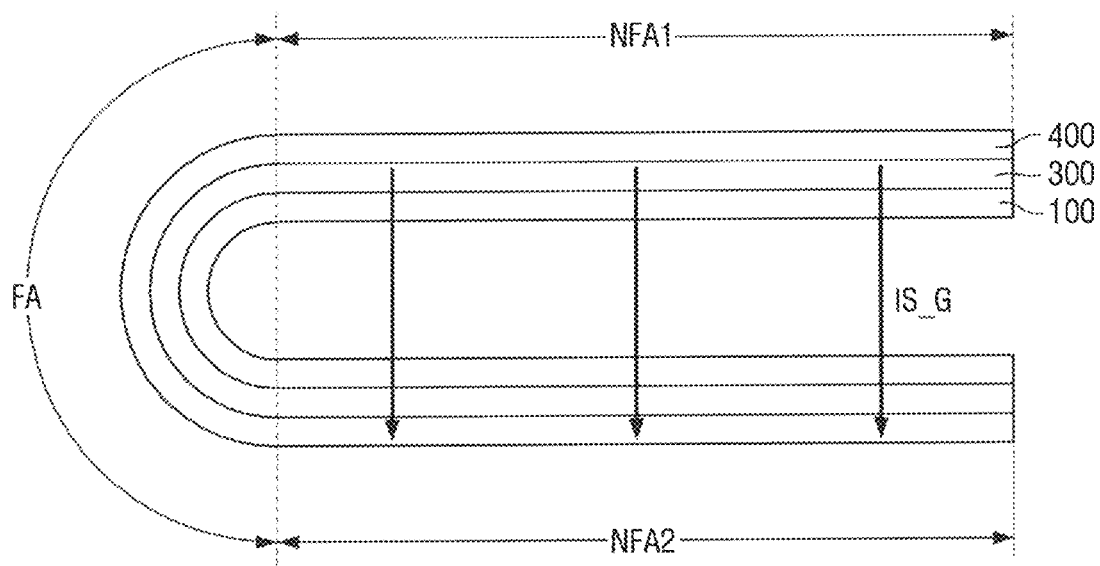

As shown in FIG. 10, after the operation of acquiring afterimage compensation data for the amounts of deterioration of the pixels present in the first non-folding area NFA1 by receiving the first color light second color light IS_G may be emitted from the pixels in the first non-folding area NFA1 of the display panel 300, and the second color light IS_G is received through the optical fingerprint sensor 400 such that afterimage compensation data is acquired regarding the amounts of deterioration of the pixels present in the first non-folding area NFA1 (FIG. 7, S40). Acquisition of afterimage compensation data for the amounts of deterioration of the pixels present in the first non-folding area NFA1 of the display panel 300 by receiving the second color light IS_G may be performed for each of a plurality of grayscales of the second color light IS_G. For example, the plurality of grayscales of the second color light IS_G may include level 0 to level 255. Level 0 of the plurality of grayscales of the second color light IS_G may have the lightest color saturation, and level 255 may have the heaviest color saturation. The color saturation of the plurality of grayscales gradually increases from level 0 to level 255.

Figure 11:
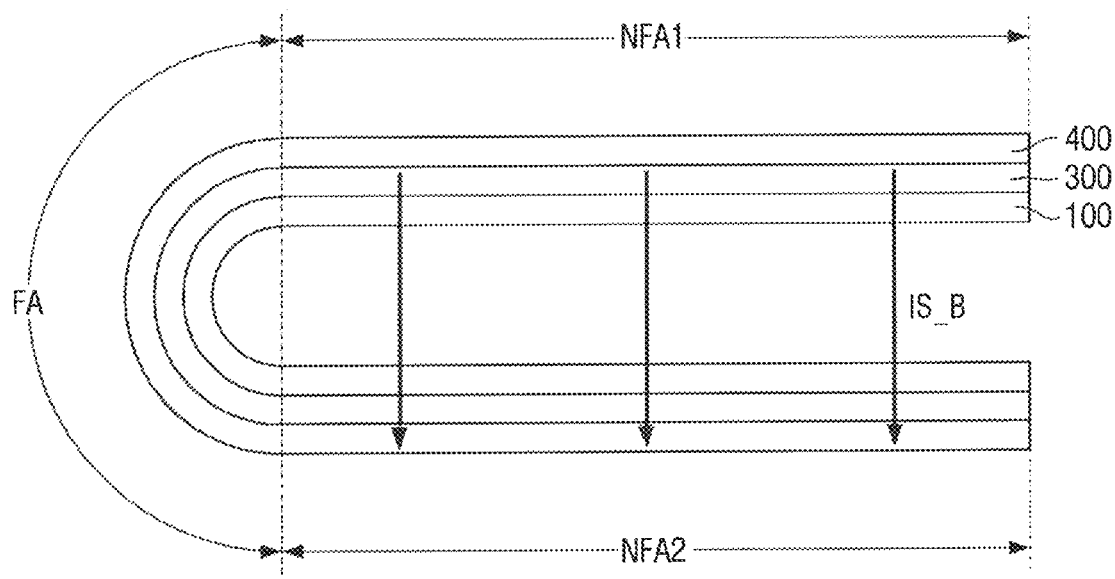

As shown in FIG. 11, after the operation of acquiring afterimage compensation data for the amounts of deterioration of the pixels by receiving the second color light IS_G, third color light IS_B may be emitted from the pixels in the first non-folding area NFA1 of the display panel 300, and the third color light IS_B is received through the optical fingerprint sensor 400 such that afterimage compensation data is acquired regarding the amounts of deterioration of the pixels present in the first non-folding area NFA1 of the display panel 300 (FIG. 7, 550). Acquisition of afterimage compensation data for the amounts of deterioration of the pixels present in the first non-folding area NFA1 of the display panel 300 by receiving the third color light may be performed for each of a plurality of grayscales of the third color light IS_B. For example, the plurality of grayscales of the third color light IS_B may include level 0 to level 255. Level 0 of the plurality of grayscales of the third color light may have the lightest color saturation, and level 255 may have the heaviest color saturation. The color saturation of the plurality of grayscales gradually increases from level 0 to level 255.

Figure 12:
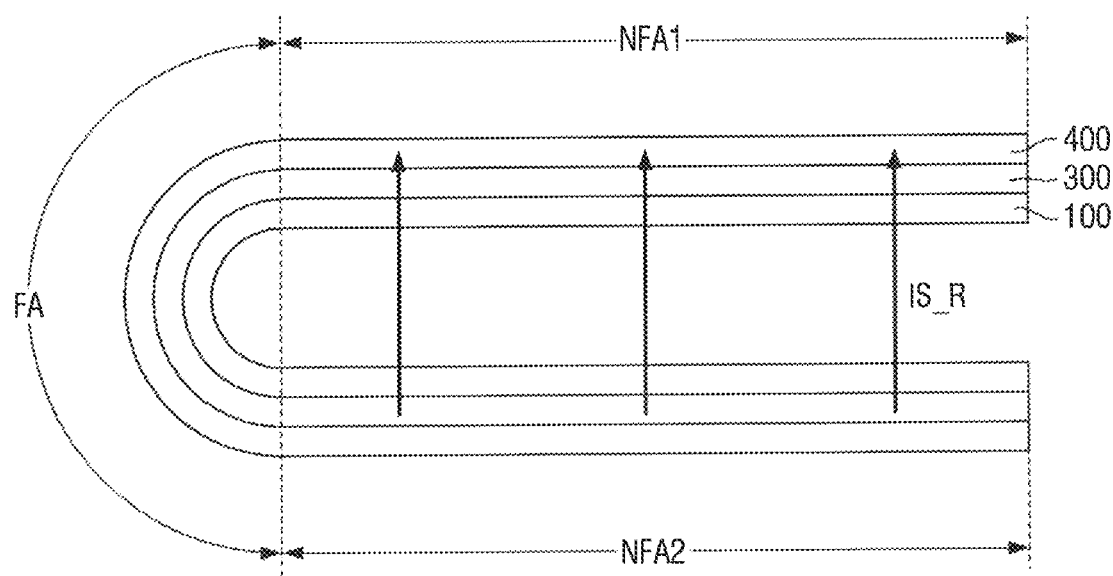

Subsequently, as shown in FIG. 12, the first color light may be emitted from pixels in the second non-folding area NFA2 of the display panel 300. Then, the first color light IS_R is received through the optical fingerprint sensor 400 such that afterimage compensation data is acquired regarding the amounts of deterioration of the pixels present in the second non-folding area NFA2. Acquisition of afterimage compensation data for the amounts of deterioration of the pixels present in the second non-folding area NFA2 of the display panel 300 by receiving the first color light IS_R may be performed for each of the plurality of grayscales of the first color light IS_R.

Figure 13:
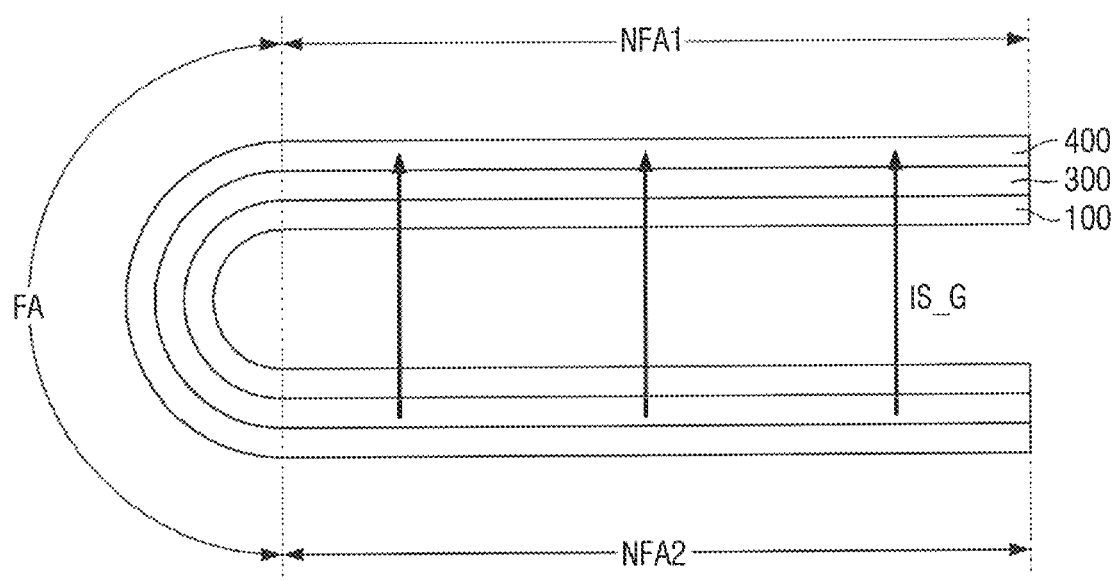

As shown in FIG. 13, after the operation of acquiring afterimage compensation data for the amounts of deterioration of the pixels present in the second non-folding area NFA2 by receiving the first color light IS_R, the second color light IS_G may be emitted from the pixels in the second non-folding area NFA2 of the display panel 300, and the second color light IS_G is received through the optical fingerprint sensor 400 such that afterimage compensation data is acquired regarding the amounts of deterioration of the pixels present in the second non-folding area NFA2.

Acquisition of afterimage compensation data for the amounts of deterioration of the pixels present in the second non-folding area NFA2 of the display panel 300 by receiving the second color light may be performed for each of the plurality of grayscales of the second color light IS_G.

Figure 14:
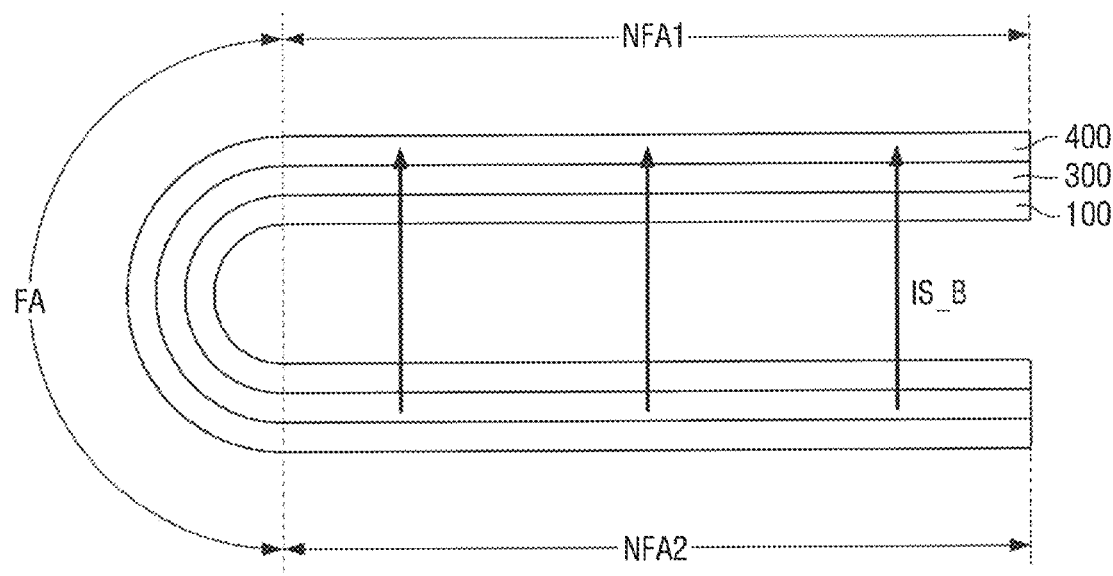

As shown in FIG. 14, after the operation of acquiring afterimage compensation data for the amounts of deterioration of the pixels by receiving the second color light the third color light may be emitted from the pixels in the second non-folding area NFA2 of the display panel 300, and the third color light IS_B is received through the optical fingerprint sensor 400 such that afterimage compensation data is acquired regarding the amounts of deterioration of the pixels present in the second non-folding area NFA2 of the display panel 300. Acquisition of afterimage compensation data for the amounts of deterioration of the pixels present in the second non-folding area NFA2 of the display panel 300 by receiving the third color light IS_B may be performed for each of the plurality of grayscales of the third color light IS_B.

After the operations of acquiring afterimage compensation data, the afterimage compensation data is processed (FIG. 7, S60).

The operation S60 of processing the afterimage compensation data may include an operation of removing data resulting from external factors from the afterimage compensation data and an operation of interpolating afterimage compensation data for a region which is not covered by the optical fingerprint sensor 400 of the display panel 300.

The reliability of the method of compensating for stains caused by deterioration of a display device can be increased through the operation S60 of processing the afterimage compensation data.

After the operation S60 of processing the afterimage compensation data, an afterimage compensation coefficient is calculated and stored (FIG. 7, S70).

Subsequently, in the operation mode of the display device 10 rather than the test mode, the pixels of the display panel 300 emit light on the basis of the afterimage compensation coefficient (FIG. 7, S80).

Figure 15:
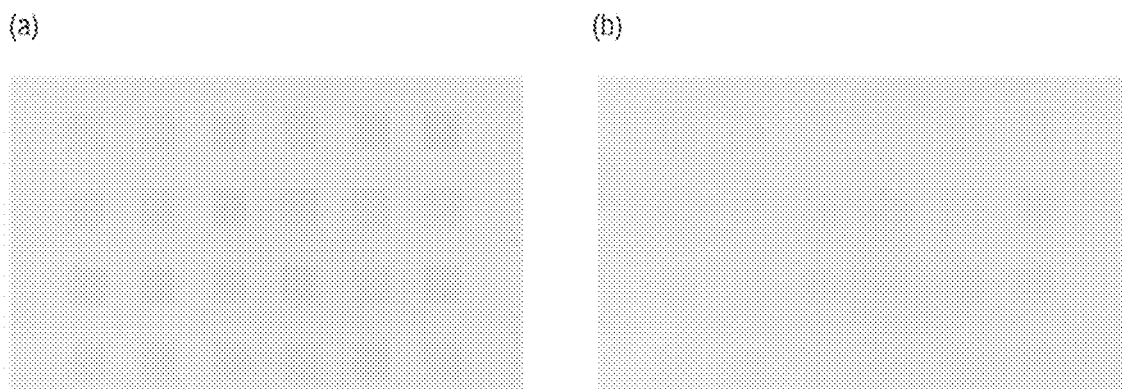
FIGS. 15A and 15B are diagrams showing effects of the method of compensating for stains caused by deterioration of a display device according to the embodiment of the present disclosure.

FIGS. 15A and 15B are diagrams showing effects of the method of compensating for stains caused by deterioration of a display device according to the embodiment of the present disclosure.

FIG. 15A shows a display screen to which the method of compensating for stains caused by deterioration of a display device according to the embodiment is not applied, and FIG. 15B shows a display screen to which the method of compensating for stains caused by deterioration of a display device according to the embodiment is applied. FIGS. 15A and 15B show that display quality can be improved by the method of compensating for stains caused by deterioration of a display device according to the embodiment.

A device for compensating for stains caused by deterioration of a display device according to an embodiment of the present disclosure will be described below. In the following embodiment, elements identical to those of the above-described embodiment will be indicated by the same reference numerals, and descriptions thereof will be omitted or simplified.

Figure 16:
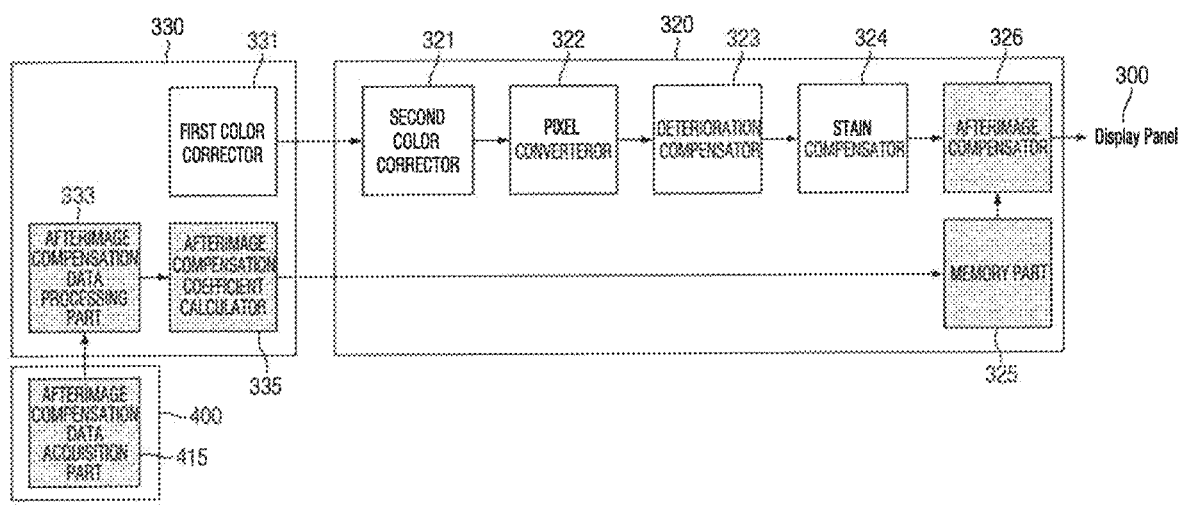
FIG. 16 is a block diagram of a device for compensating for stains caused by deterioration of a display device according to an embodiment of the present disclosure.

FIG. 16 is a block diagram of a device for compensating for stains caused by deterioration of a display device according to an embodiment of the present disclosure.

The device for compensating for stains caused by deterioration of a display device according to the embodiment may operate while the display device is in a test mode.

The device for compensating for stains caused by deterioration of a display device according to the embodiment may include an illuminance sensor which determines whether an illuminance is a reference value or less, pixels of a display panel 300 which emit first color light when the illuminance is the reference value or less, an afterimage compensation data acquisition part 415 of an optical fingerprint sensor 400 which acquires afterimage compensation data relating to the amounts of deterioration of the pixels by receiving the first color light, and an application chip 330 which processes the acquired afterimage compensation data and calculates an afterimage compensation coefficient.

The afterimage compensation data acquisition part 415 stores afterimage compensation data relating to the amounts of deterioration of the pixels acquired by receiving first color light, afterimage compensation data relating to the amounts of deterioration of the pixels acquired by receiving second color light, and afterimage compensation data relating to the amounts of deterioration of the pixels acquired by receiving third color light.

The application chip 330 may include a first color corrector 331 which receives pixel data of the pixels and performs first color correction, an afterimage compensation data processing part 333 which processes the afterimage compensation data stored in the afterimage compensation data acquisition part 415, and an afterimage compensation coefficient calculator 335 which receives the processed afterimage compensation data and calculates the afterimage compensation coefficient.

The device for compensating for stains caused by deterioration of a display device may further include a display driver circuit 320. The display driver circuit 320 may include a second color corrector 321 that performs second color correction on the pixel data on which color correction is performed by the first color corrector 331, a pixel converter 322 that performs pixel conversion on the pixel data on which second color correction is performed by the second color corrector 321, a deterioration compensator 323 that performs deterioration compensation on the pixel data on which pixel conversion is performed by the pixel converter 322, a stain compensator 324 that performs stain compensation on the pixel data on which deterioration compensation is performed by the deterioration compensator 323, a memory part 325 that stores the afterimage compensation coefficient calculated by the afterimage compensation coefficient calculator 335, and an afterimage compensator 326 that converts the pixel data on Which stain compensation is performed by the stain compensator 324 on the basis of the afterimage compensation coefficient stored in the memory part 325.

The first and second color correctors 331 and 321 adjust a contrast ratio and saturation of the pixel data, respectively.

The pixel converter 322 performs pixel conversion on the pixel data provided by the second color corrector 321 so that the pixel data may correspond to a pixel array of a display device. For example, when the pixel data provided by the second color corrector 321 includes red-green-blue (RGB) pixel data and the display device has a PenTile pixel arrangement, the pixel converter 322 may convert the RGB pixel data into red-green-blue screen (RGBG) pixel data.

The deterioration compensator 323 performs deterioration compensation on the pixel data converted by the pixel converter 322. The deterioration compensator 323 performs deterioration compensation on the pixel data on the basis of accumulated deterioration data. For example, the deterioration compensator 323 may be a stress profiler.

The stain compensator 324 performs stain compensation on the pixel data on which deterioration compensation is performed by the deterioration compensator 323 on the basis of a stain compensation coefficient calculated through an optical stain compensation process performed on the display device before the display device is shipped to the market.

The afterimage compensator 326 converts the pixel data on which stain compensation is performed by the stain compensator 324 on the basis of the afterimage compensation coefficient stored in the memory part 325 and displays the converted pixel data through the display panel 300 in the operation mode of the display device. The pixels of the display panel 300 emit light while the display device is in an operation mode based on the pixel data provided by the stain compensator 324.

A device for compensating for stains caused by deterioration of a display device according to another embodiment of the present disclosure will be described below. In the following embodiment, elements identical to those of the above-described embodiment will be indicated by the same reference numerals, and descriptions thereof will be omitted or simplified.

Figure 17:
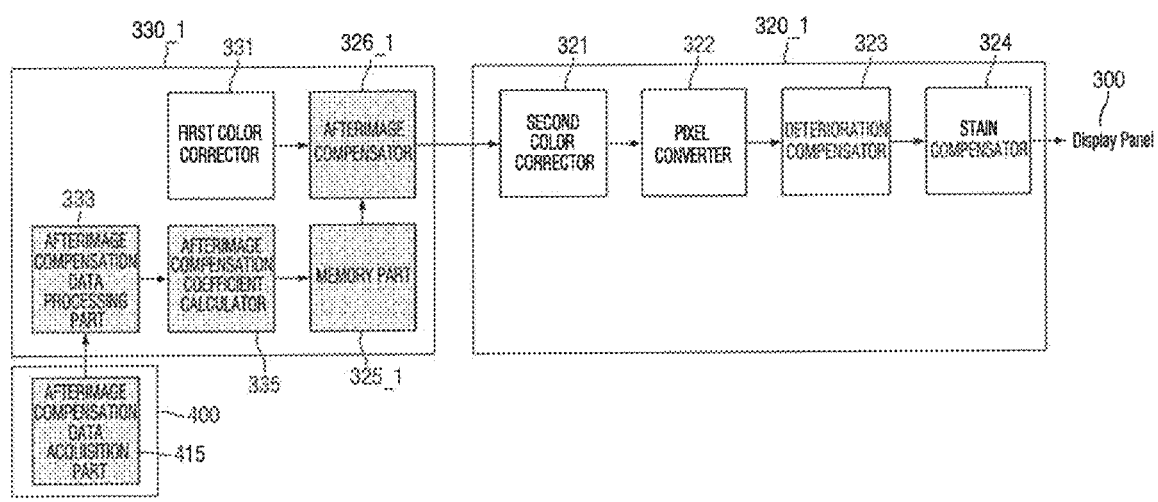
FIG. 17 is a block diagram of a device for compensating for stains caused by deterioration of a display device according to another embodiment of the present disclosure.

FIG. 17 is a block diagram of a device for compensating for stains caused by deterioration of a display device according to another embodiment of the present disclosure.

Referring to FIG. 17, the device for compensating for stains caused by deterioration of a display device according to this embodiment is different from the device for compensating for stains caused by deterioration of a display device according to FIG. 16 in that an application chip 330_1 includes a memory part 325_1 and an afterimage compensator 326_1 and a display driver circuit 320_1 does not include the memory part 325 and the afterimage compensator 326.

In other words, the device for compensating for stains caused by deterioration of a display device according to this embodiment is different from the device for compensating for stains caused by deterioration of a display device according to FIG. 16 in that the afterimage compensator 326_1 converts pixel data on which first color correction is performed by a first color corrector 331 on the basis of the afterimage compensation coefficient stored in the memory part 325_1 and provides the converted pixel data to a second color corrector 321 of the display driver circuit 320_1.

Figure 18:
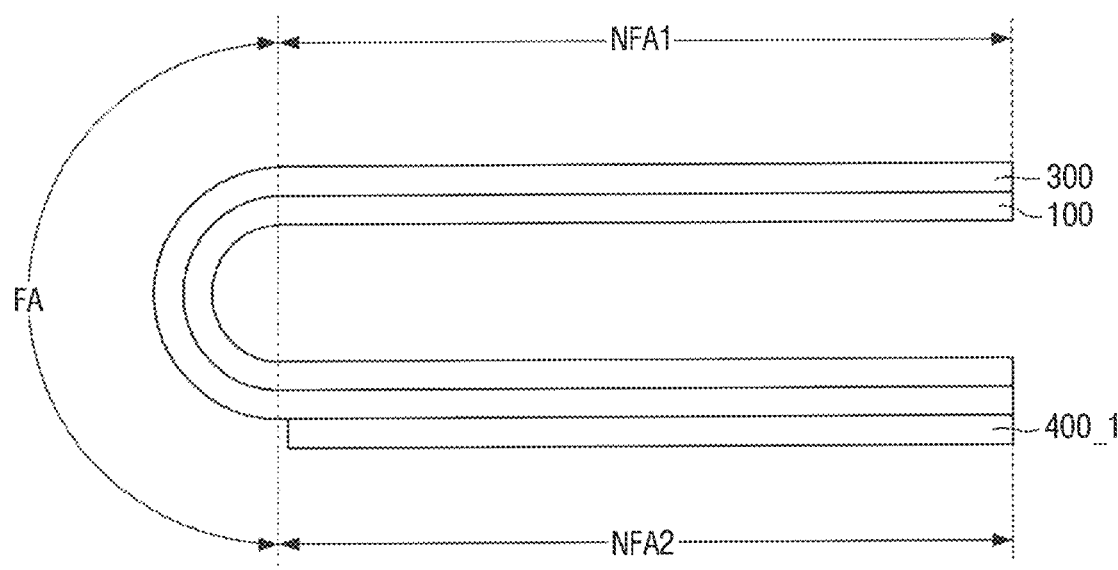
FIGS. 18 to 20 are cross-sectional views illustrating process operations of a method of compensating for stains caused by deterioration of a display device according to another embodiment of the present disclosure.
Figure 19:
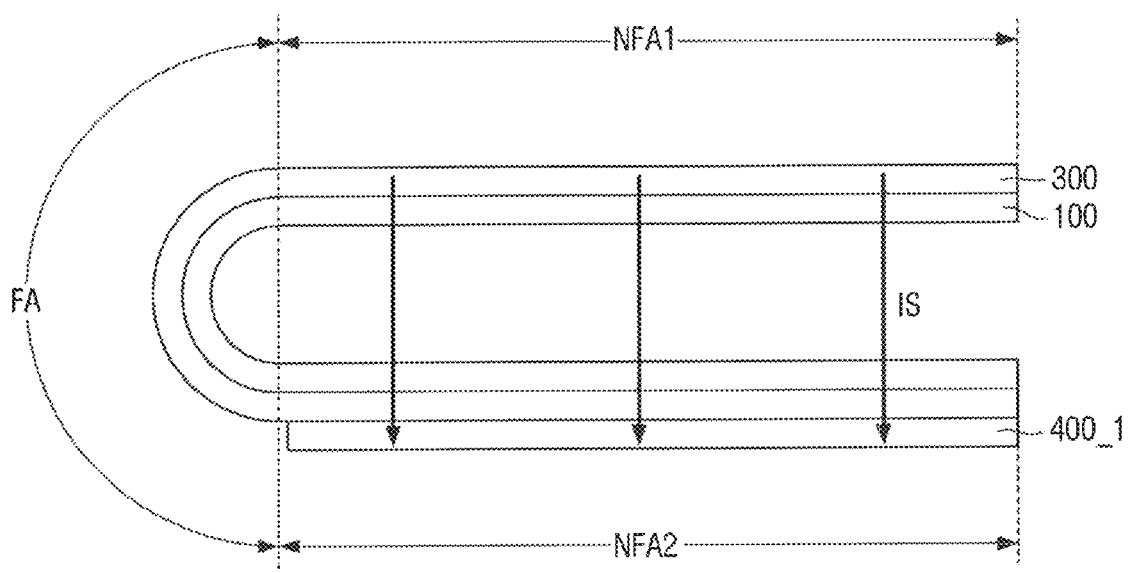
Figure 20:
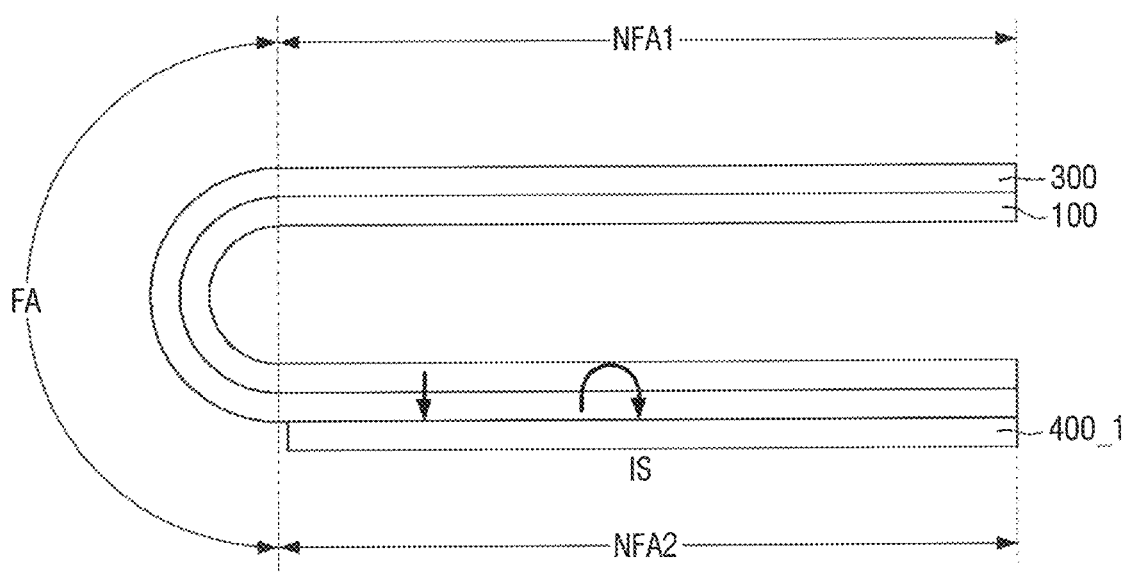

FIGS. 18 to 20 are cross-sectional views illustrating process operations of a method of compensating for stains caused by deterioration of a display device according to another embodiment of the present disclosure.

Referring to FIGS. 18 to 20, an optical fingerprint sensor 400_1 may not be disposed in an entire display panel 300 and may be only disposed in a first non-folding area NFA1 or a second non-folding area NFA2. FIGS. 18 to 20 illustrates a case in which the optical fingerprint sensor 400_1 is only disposed in the second non-folding area NFA2.

In the method of compensating for stains caused by deterioration of a display device according to the other embodiment, as shown in FIG. 19, color light beams IS (the first to third color light beams of FIGS. 9 to 11) are emitted from pixels in the first non-folding area NFA1 of the display panel 300, and the optical fingerprint sensor 400_1 of the second non-folding area NFA2 receives the color light beams IS to acquire afterimage compensation data for the amounts of deterioration of the pixels in the first non-folding area NFA1. Also, as shown in FIG. 20, the colors light beams IS (the first to third color light beams of FIGS. 9 to 11) are emitted from pixels in the second non-folding area NFA2 of the display panel 300.

As shown in FIG. 20, the color light beams IS emitted from the pixels in the second non-folding area NFA2 of the display panel 300 may directly reach the optical fingerprint sensor 400_1 or may be reflected by the cover window 100 and reach the optical fingerprint sensor 400_1.

The color light beams IS which are emitted from the pixels in the second non-folding area NFA2 and reach the optical fingerprint sensor 400_1 have different optical characteristics than the color light beams IS which are emitted from the pixels in the first non-folding area NFA1 and reach the optical fingerprint sensor 400_1.

In other words, it is necessary to tune optical characteristics between afterimage compensation data acquired from color light beams IS which are emitted from the pixels in the second non-folding area NFA2 and reach the optical fingerprint sensor 400_1 (hereinafter, first afterimage compensation data) and afterimage compensation data acquired from color light beams IS which are emitted from the pixels in the first non-folding area NFA1 and reach the optical fingerprint sensor 400_1 (hereinafter, second afterimage compensation data).

Accordingly, the second afterimage compensation data may be processed after the optical characteristics are converted.

Figure 21:
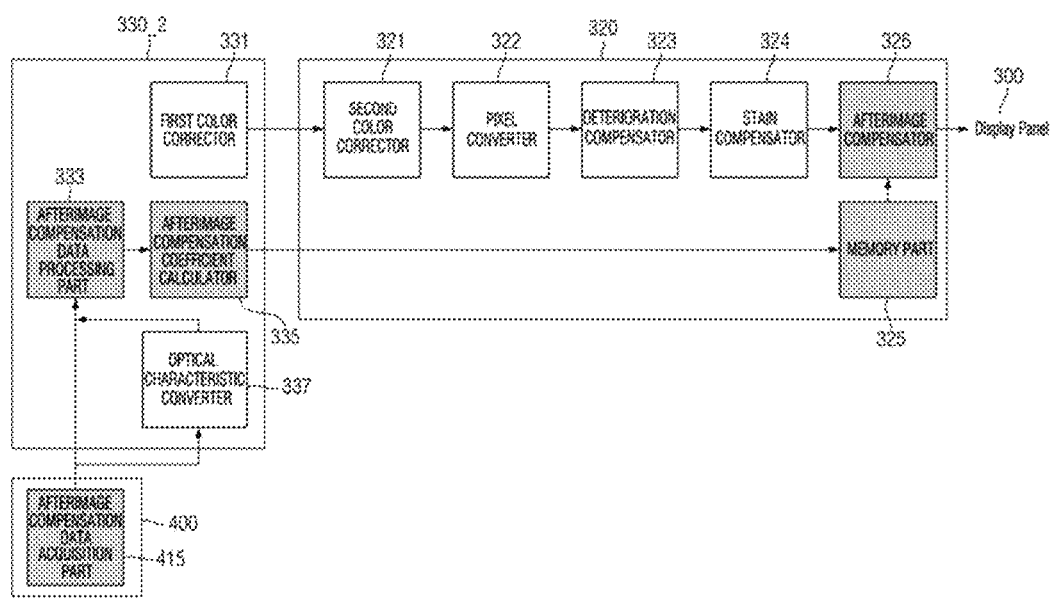
FIG. 21 is a block diagram of a device for compensating for stains caused by deterioration of a display device according to still another embodiment of the present disclosure.

FIG. 21 is a block diagram of a device for compensating for stains caused by deterioration of a display device according to still another embodiment of the present disclosure.

Referring to FIG. 21, an application chip 330_2 of the device for compensating for stains caused by deterioration of a display device according to this embodiment additionally includes an optical characteristic converter 337 which converts optical characteristics of the second afterimage compensation data described with reference to FIG. 20. The second afterimage compensation data of which the optical characteristics are converted by the optical characteristic converter 337 may be provided to an afterimage compensation data processing part 333.

Figure 22:
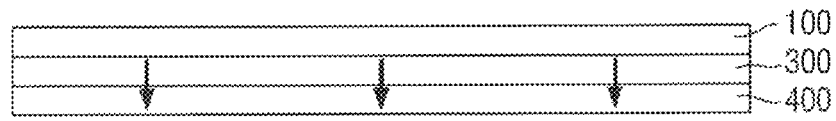
FIG. 22 is a cross-sectional view illustrating a process operation of a method of compensating for stains caused by deterioration of a display device according to still another embodiment of the present disclosure.

FIG. 22 is a cross-sectional view illustrating a process operation of a method of compensating for stains caused by deterioration of a display device according to still another embodiment of the present disclosure.

Referring to FIG. 22, the method of compensating for stains caused by deterioration of a display device according to this embodiment can be applied to a flat panel display device as well as the foldable display device of FIG. 8.

Detailed descriptions have been provided above and are not reiterated.

With the device and method for compensating for stains caused by deterioration of a display device according to the embodiments, it is possible to cope with deterioration stains developed by a user and provide reliable display quality.

Effects of the embodiments are not limited to the above-described effects, and various other effects are included in this specification.

Although embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method of compensating for stains caused by deterioration of a display device, the display device including an illuminance sensor and a display panel including a folding area, a first non-folding area positioned on a first side of the folding area, and a second non-folding area positioned on a second side of the folding area, the first non-folding area including first pixels, the second non-folding area including second pixels and an optical fingerprint sensor, the method comprising:

determining, while in a test mode of the display device and via the illuminance sensor, whether an illuminance is a reference value or less;

emitting, while in the test mode of the display device, first light of a first color from the first pixels when the illuminance is the reference value or less;

acquiring, while in the test mode of the display device, first afterimage compensation data relating to amounts of deterioration of the first pixels by receiving the first light through the optical fingerprint sensor;

emitting, while in the test mode of the display device, second light of the first color from the second pixels when the illuminance is the reference value or less;

acquiring, while in the test mode of the display device, second afterimage compensation data relating to amounts of deterioration of the second pixels by receiving the second light through the optical fingerprint sensor;

tuning an optical characteristic of the first afterimage compensation data based on an optical characteristic of the second afterimage compensation data; and converting, while in the test mode of the display device, pixel data based on the tuned first afterimage compensation data.

2. The method of claim 1, further comprising acquiring a first plurality of afterimage compensation data including the first afterimage compensation data and the second afterimage compensation data based on a plurality of grayscales of the first color.

3. The method of claim 2, further comprising:

emitting, while in the test mode of the display device, third light of a second color from the first pixels;

acquiring, while in the test mode of the display device, third afterimage compensation data relating to amounts of deterioration of the first pixels by receiving the third light through the optical fingerprint sensor;

emitting, while in the test mode of the display device, fourth light of the second color from the second pixels; and acquiring, while in the test mode of the display device, fourth afterimage compensation data relating to amounts of deterioration of the second pixels by receiving the fourth light through the optical fingerprint sensor.

4. The method of claim 3, further comprising acquiring a second plurality of afterimage compensation data including the third afterimage compensation data and the fourth afterimage compensation data based on a plurality of grayscales of the second color.

5. The method of claim 3, further comprising:

emitting, while in the test mode of the display device, fifth light of a third color from the first pixels;

acquiring, while in the test mode of the display device, fifth afterimage compensation data relating to amounts of deterioration of the first pixels by receiving the fifth light through the optical fingerprint sensor;

emitting, while in the test mode of the display device, sixth light of the third color from the second pixels; and acquiring, while in the test mode of the display device, sixth afterimage compensation data relating to amounts of deterioration of the second pixels by receiving the sixth light through the optical fingerprint sensor.

6. The method of claim 5, further comprising acquiring a third plurality of afterimage compensation data including the fifth afterimage compensation data and the sixth afterimage compensation data based on a plurality of grayscales of the third color.

7. The method of claim 5, wherein each of the first color to the third color is any one of red, green, and blue, and the first color to the third color differ from each other.

8. The method of claim 1, wherein
the display device is in a folded state during the test mode of the display device.

9. The method of claim 1, further comprising, after the acquiring of the first afterimage compensation data, processing, while in the test mode of the display device, the first afterimage compensation data.

10. The method of claim 9, wherein the processing of the first afterimage compensation data comprises:

removing data resulting from external factors from the first afterimage compensation data; and interpolating the first afterimage compensation data for a region of the display panel which is not covered by the optical fingerprint sensor.

11. The method of claim 9, wherein the display device further includes a cover window disposed on the display panel, the method further comprising:

providing the second light from the second pixels to the cover window; and providing the second light from the cover window to the optical fingerprint sensor.

12. The method of claim 9, further comprising, after the processing of the first afterimage compensation data:

calculating, while in the test mode of the display device, an afterimage compensation coefficient; and storing, while in the test mode of the display device, the calculated afterimage compensation coefficient.

13. The method of claim 12, further comprising emitting, while in an operation mode of the display device and via the pixels of the display panel, light based on the afterimage compensation coefficient, and wherein the operation mode of the display device is different than the test mode of the display device.

14. A device for compensating for stains caused by deterioration of a display device, the device comprising:

an illuminance sensor configured to determine, while the display device is in a test mode, whether an illuminance is a reference value or less;

a display panel including a folding area, a first non-folding area positioned on a first side of the folding area, and a second non-folding area positioned on a second side of the folding area, wherein the first non-folding area includes first pixels configured to emit, while the display device is in the test mode, first light of a first color when the illuminance is the reference value or less, and wherein the second non-folding area includes:

second pixels configured to emit, while the display device is in the test mode, second light of the first color when the illuminance is the reference value or less, and an optical fingerprint sensor configured to acquire, while the display device is in the test mode, first afterimage compensation data relating to amounts of deterioration of the first pixels by receiving the first light and second afterimage compensation data relating to amounts of deterioration of the second pixels by receiving the second light;

an application chip configured to, while the display device is in the test mode:

tune an optical characteristic of the first afterimage compensation data based on an optical characteristic of the second afterimage compensation data, process the tuned first afterimage compensation data to obtain processed afterimage compensation data, and calculate an afterimage compensation coefficient based on the processed afterimage compensation data and a display driver circuit configured to, while the display device is in the test mode:

convert pixel data based on the afterimage compensation coefficient.

15. The device of claim 14, wherein the display driver circuit is further configured to store, while the display device is in the test mode, the calculated afterimage compensation coefficient and transmit, while the display device is in an operation mode, the converted pixel data to the pixels, wherein the operation mode is different than the test mode.

* * * * *